INVENTORS
FERDINAND WEINROTTER
ALFRED SCHMIDT
WALTER MÜLLER
WALTER BÖHLER

BY *Wenderoth, Lind & Ponack*

ATTORNEYS

United States Patent Office 3,497,510
Patented Feb. 24, 1970

3,497,510
PROCESS FOR THE PREPARATION OF MELAMINE
Ferdinand Weinrotter and Alfred Schmidt, Linz (Danube), Walter Muller, Leonding, near Linz (Danube), and Walter Bohler, Linz (Danube), Austria, assignors to Osterreichische Stickstoffwerke Aktiengesellschaft, Linz (Danube), Austria
Filed Feb. 10, 1967, Ser. No. 615,190
Claims priority, application Austria, Feb. 10, 1966, A 1,187/66
Int. Cl. C07d 55/30
U.S. Cl. 260—249.7                       2 Claims

ABSTRACT OF THE DISCLOSURE

A static broad catalyst layer for the catalytical preparation of melamine from gaseous cyanic acid and ammonia in which the entering gas has a flow speed through the catalyst bed of 30 to 80 normal cubic metres per hour per square metre of catalyst cross sectional area is cooled by cooling elements which consist of a wide outer hollow tube, closed off from the furnace atmosphere and one or more narrower tubes with coolant flowing through them arranged in the interior of the wider outer tube.

Figure 1:
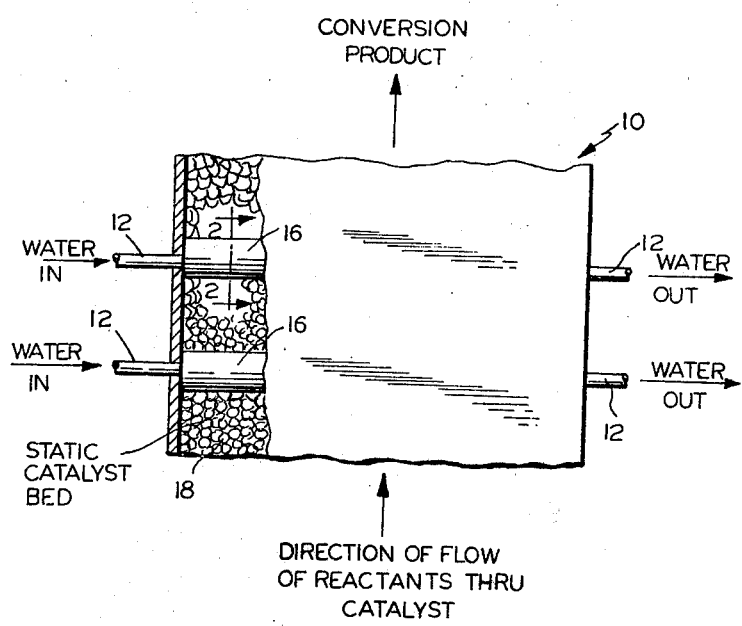

This invention relates to the preparation of melamine and more particularly to an improved process for the preparation of melamine from cyanic acid.

In a prior known process, the catalytic synthesis of melamine from cyanic acid gas and ammonia is carried out by introducing the gas at a low temperature into a catalyst layer whose horizontal extent is equal to or greater than its height, and passing the gas slowly through this layer (for example at a flow speed of 30 to 80 Nm.$^3$/h.m.$^2$) without cooling. The heat of reaction of the exothermic melamine synthesis is conducted away with the reaction gas mixture as perceptible heat of the reaction gas. To prevent the catalyst overheating the content of cyanic acid gas in the entering gas mixture must therefore be kept low, i.e. relatively large quantities of diluent ammonia gas are required to conduct away the heat of reaction.

If the throughput of cyanic acid is to be increased by higher concentrations of the cyanic acid gas in the entering gas stream, without affecting the purity of the product and without overheating the catalyst, then the catalyst layer must additionally be cooled.

It is usual in chemical technology, under similar circumstances to those used in the synthesis of melamine, to use a tubular furnace filled with catalyst which permits a part of the generated heat of reaction to be led away by indirect cooling. For the synthesis of melamine it has been found that this type of cooling is not successful since the cooling along the narrow and tall catalyst tubes cannot be adjusted to the differing temperature conditions along these tubes. Thus alternate cold and overheated areas are produced in the catalyst, and these reduce the throughput and lead to contamination of the melamine by by-products.

Surprisingly, it has been found in the above-described process that it is possible to cool the catalyst effectively and economically without interfering with the course of reaction, without producing by-products, and whilst simultaneously increasing the throughput.

According to the invention, the excess heat of reaction liberated is carried away by means of cooling elements, without flow of primary coolant through them, which elements are embedded in the catalyst layer.

The heat radiating into the interior of the cooling elements which are embedded in the catalyst layer and are closed off in a gas-tight manner from the atmosphere of the furnace, is then taken up by one or more narrower tubes which are arranged, preferably axially, in the interior of the wider outer tubes, and which have coolant flowing through them and thus carry away the heat transmitted to them by radiation from the inner wall of the outer tubes. The space between the outer wider cooling tubes and the inner narrower cooling tube or tubes is either filled with gas or with air or may also optionally be evacuated. This space is such that any gas or air therein is restrained from movement.

The result of this is that excessive cooling of the catalyst at the interface between the catalyst and the cooling element does not occur and that on the other hand the excess heat of reaction is, depending upon the dimensions of the total surface of the outer tubes, carried away by radiation into their interior space. Thus heat is carried away without significantly interfering with the temperature distribution in the catalyst bed.

The elements serving to radiate away the heat are, in contrast to the cooling of tubular furnaces, arranged in the catalyst bed at right angles to the direction of gas flow, that is to say normally horizontally. The result of this is that the cooling acts uniformly within a layer which is at the same temperature. The amount of heat which has to be carried away from the catalyst is slight. For example, in the case of gas cooling by 50° C. being desired, it is 900 to 2400 kcal./h. per square metre of catalyst bed cross section, depending upon the speed of flow of the gas.

Depending on the height of the apparatus, the size of the catalyst layer and the amount of heat to be carried away, the outer tubes have diameters of 40 to 200 mm., whereas the narrower actual cooling tubes arranged along their axes have a diameter of 5 to 20 mm. The coolant flowing through the inner tubes, generally water, is kept at temperatures of 10° to 100° C. depending on requirements. The requisite amount of heat is withdrawn from the catalyst by appropriately dimensioning the surface of the outer tubes or appropriately selecting the temperature of the cooling water in the inner tubes.

By arranging several such cooling elements in various planes of the catalyst layer, appropriately relatively staggered with respect to each other, it is furthermore possible to allow the cooling to progress in step with the migration of the catalyst layer which at any time is the most active, and whose height is 20 to 50 mm., from one position of the cooling elements to the next so that at all times the catalyst layer which exhibits the highest temperature rise is the one which is most effectively cooled. Since the emission of radiation rises as the fourth power of the absolute temperature, the tubes which are present in the hot part of the catalyst layer cool up to three times as effectively, because of the higher temperature difference which there exists, as the tubes which are present in the part of the layer which is still cool, without special control being necessary.

The equalisation of temperature in the catalyst layer also significantly increases its working life, since it is particularly the peak temperatures, which lead to a thermal decomposition of the melamine already formed and hence to the formation of residues which can no longer be sublimed away on the catalyst, which are suppressed.

A particular advantage of the cooling according to the invention is the fact that, corresponding to the amount of heat withdrawn from the hottest layer of the catalyst, the concentration of cyanic acid in the entering gas mixture can be increased, so that thereby the amount of cyanic acid converted is increased, without the purity of the resulting melamine declining. Since now the carrying away of the heat of reaction generated during the synthesis no longer exclusively takes place by means of the reaction gas, a considerable saving in the amount of ammonia gas required by the process results.

The accompanying drawings diagrammatically illustrate the relationship of parts according to this invention.

Figure 2:
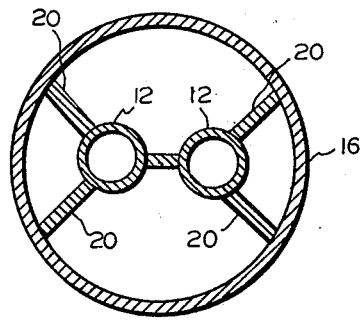

FIG. 1 is a fragmentary elevation of a conversion chamber with a part broken away to show the cooling arrangement of pipes and tubes according to the invention; and FIG. 2 is a sectional view along line 2—2 of FIG. 1.

FIG. 1 shows a conversion chamber 10 containing a static catalyst bed 18 having cooling pipes 16 staggered horizontally throughout the bed. The smaller pipes 12 carrying the coolant water are centrally axially positioned by spacers 20 within the larger pipes 16. The reactants flow upwardly, as designated by the bottom arrow, through the catalyst bed 18 wherein the reaction takes place and the conversion product is evolved from the top of the bed, as designated by the upper arrow. FIG. 2 shows the small cooling pipes 12 centrally positioned by the spaces 20 within the larger pipe 16.

Details as set forth in the following are illustrative but not limitative.

EXAMPLE

A starting gas mixture of vaporized urea diluted by ammonia ($NH_3$) is passed upwardly through a single, loose, granular catalyst layer of active alumina in coarse-grained form. The layer is cylindrical, about 2.7 meters in diameter and about 0.5 meter in height.

Two superposed and relatively staggered rows of pipes each extend horizontally through the catalyst layer, the uppermost row being at a vertical distance of about 15 centimeters from the top of the catalyst layer and the lowermost row being at a vertical distance of about 35 centimeters from the top of the layer. The centers of the pipes in each row are spaced at a horizontal distance of about 36.7 centimeters from each other, the pipes having an outside diameter of about 10.8 centimeters.

Two cooling tubes of about 0.8 centimeter in outside diameter are centrally axially positioned, by means of per se conventional spaces in each pipe. Water at 20° C. passes through the said cooling tubes. The space between the tubes and the respective pipe is air-filled.

Because of the thus-achieved cooling effect, the hourly throughput of vaporized urea diluted with $NH_3$ can be raised to 100 kilograms of vaporized urea+170 kilograms of $NH_3$ with production of a correspondingly increased yield of melamine of the same purity as is achieved in the absence of said pipes-and-cooling-tubes arrangement, the maximum achievable hourly throughput in the absence of the latter being only 65 kilograms of vaporized urea+170 kilograms of $NH_3$.

The same result is achieved when the activated alumina catalyst is replaced e.g. by silica gel, aluminum silicate or any other catalyst conventionally employed in converting urea+$NH_3$ to melamine.

The urea is first converted into cyanic acid. If desired, the starting gas mixture may be cyanic acid+$NH_3$.

We claim:

1. In a process for preparing melamine from gaseous cyanic acid and ammonia with the aid of a static catalyst layer, the improvement which comprises passing the gaseous reactants through a catalyst bed containing cooling elements in which the primary coolant is a stationary gas or vacuum, closed off from the furnace atmosphere and in which a second coolant separated from the primary coolant is allowed to flow through the primary coolant, said cooling elements being uniformly staggered through the bed so as to gradually carry away the heat of reaction in such a manner as to avoid undesirable hot and cold spots throughout the catalyst bed.

2. In a method of preparing melamine from gaseous cyanic acid and ammonia with the aid of a static catalyst layer, the improvement which comprises passing the gaseous reactants through the catalyst bed; uniformly cooling the catalyst bed by passing a stream of coolant transversely to the flow of reacting gases at various planes of the catalyst bed and staggered uniformly throughout said coolant being spaced from the catalyst and being surrounded by a stationary gaseous atmosphere or a vacuum between the coolant and periphery of the space which separates the catalyst from the coolant, said stationary gaseous atmosphere or vacuum being closed off from the coolant and the furnace atmosphere, whereby the combination of the coolant flow and the stationary gaseous atmosphere or vacuum gradually carry away the excess heat of reaction in such a manner as to avoid undersirable hot and cold spots through the catalyst bed.

References Cited

UNITED STATES PATENTS 3,310,559 3/1967 Weinrotter et al. ___ 260—249.7

FOREIGN PATENTS 697,799 11/1964 Canada.

HENRY R. JILES, Primary Examiner

J. M. FORD, Assistant Examiner